D. W. MERRILL.
STUMP EXTRACTOR.
APPLICATION FILED MAR. 28, 1912.

1,099,711.

Patented June 9, 1914.

4 SHEETS—SHEET 1.

Witnesses:
J. P. Walker.
L. L. Richards

Inventor
D. W. Merrill
By Chandler & Chandler
Attorneys

D. W. MERRILL.
STUMP EXTRACTOR.
APPLICATION FILED MAR. 28, 1912.

1,099,711.

Patented June 9, 1914.
4 SHEETS—SHEET 2.

Witnesses:—
J. P. Wahler.
Chas. L. Richardson.

Inventor.
D. W. Merrill
By Chandler & Chandler
Attorneys

D. W. MERRILL.
STUMP EXTRACTOR.
APPLICATION FILED MAR. 28, 1912.
1,099,711.
Patented June 9, 1914.
4 SHEETS—SHEET 3.
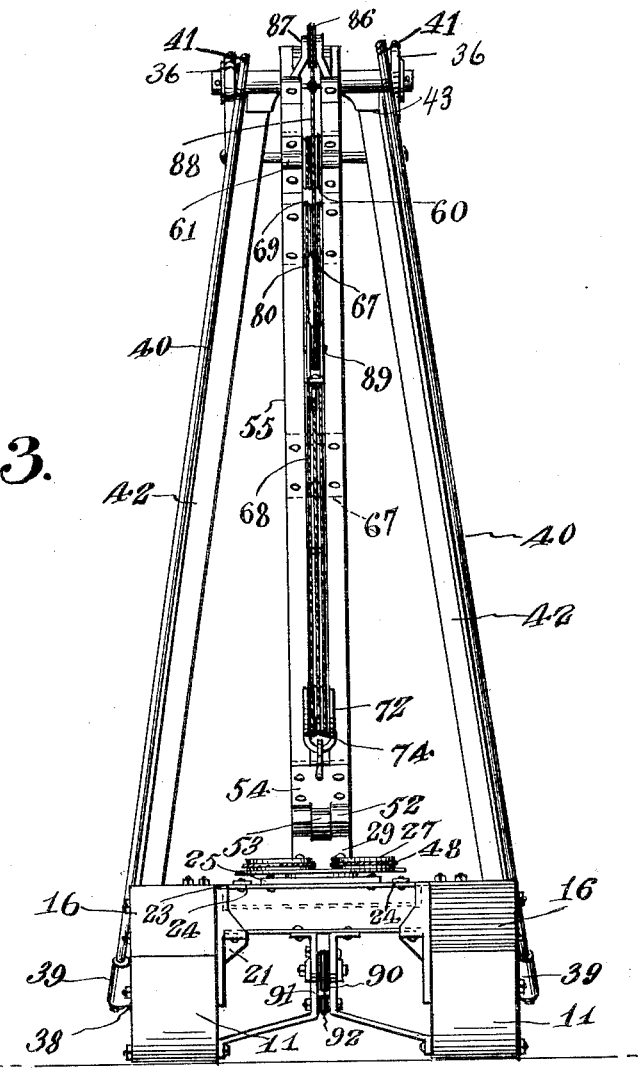
Fig. 3.
Witnesses:
Inventor
D. W. Merrill.
Attorneys

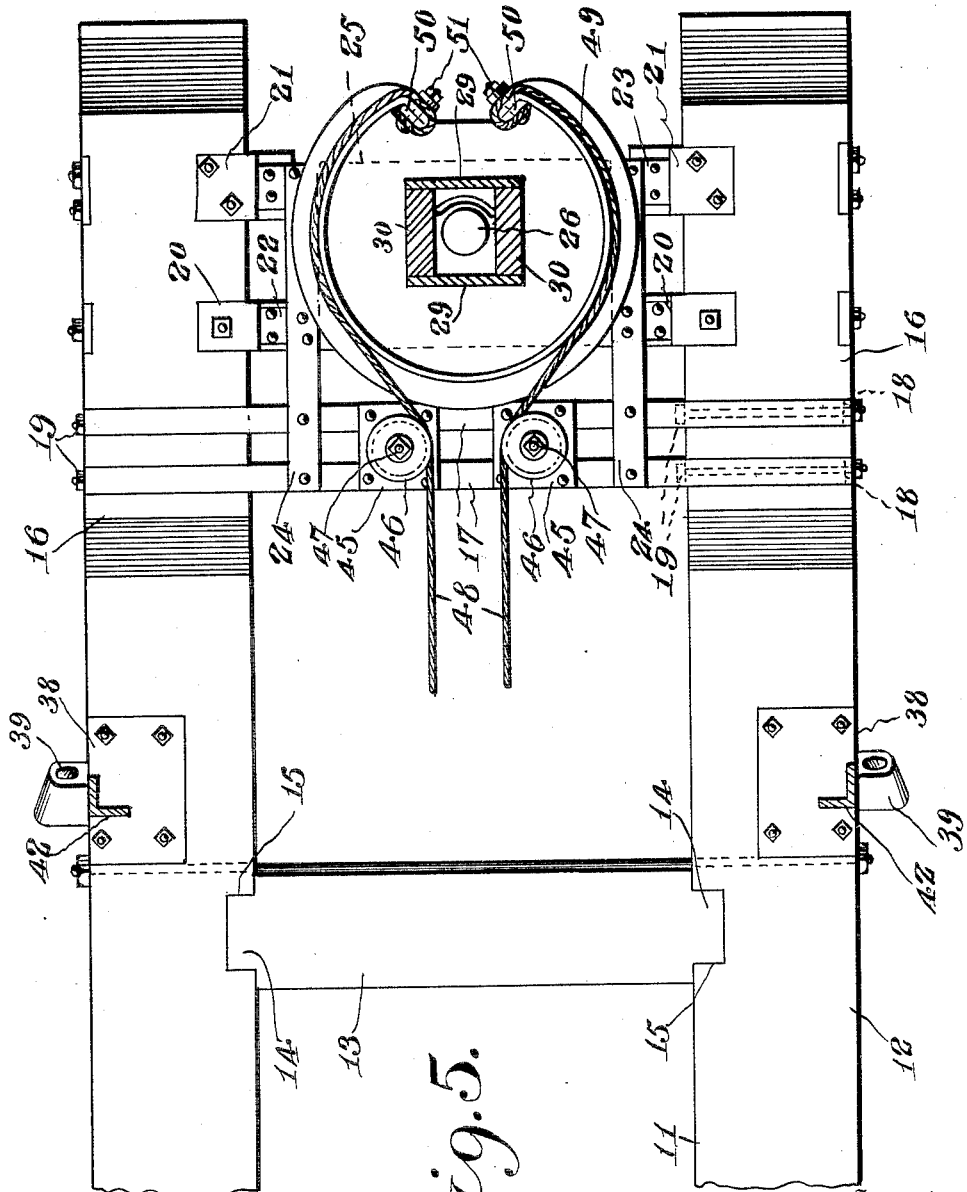

UNITED STATES PATENT OFFICE.

DENNIS W. MERRILL, OF ALBANY, OREGON.

STUMP-EXTRACTOR.

1,099,711.  Specification of Letters Patent. Patented June 9, 1914.

Application filed March 28, 1912. Serial No. 686,753.

*To all whom it may concern:*

Be it known that I, DENNIS W. MERRILL, a citizen of the United States, residing at Albany, in the county of Linn, State of Oregon, have invented certain new and useful Improvements in Stump-Extractors; and I do hereby declare the following to be a full, clear, and exact description of the invention, such as will enable others skilled in the art to which it appertains to make and use the same.

This invention relates to new and useful improvements in stump extractors.

An object of this invention is the provision of a stump extractor which may be transported from one locality to another and in which the extracting mechanism is adjustable so that the apparatus may be used to extract any sized stump.

A further object of this invention is the provision of a stump extractor in which the supporting boom may be swung to any desired position relative to the main mast.

A still further object of this invention is to improve and simplify devices of this character, rendering them comparatively simple and inexpensive to manufacture, reliable and efficient in use and readily operated.

Figure 1:
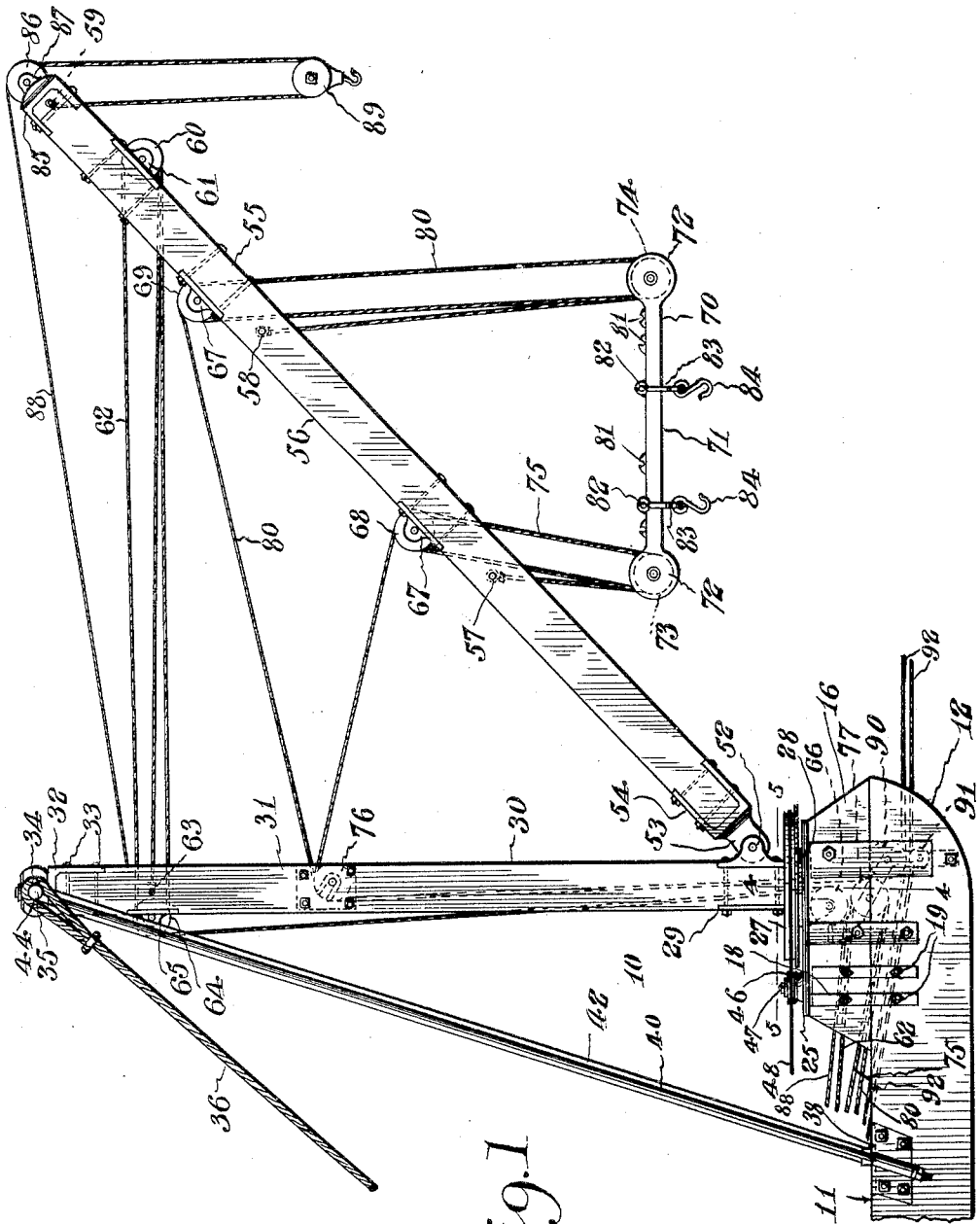
Figure 4:
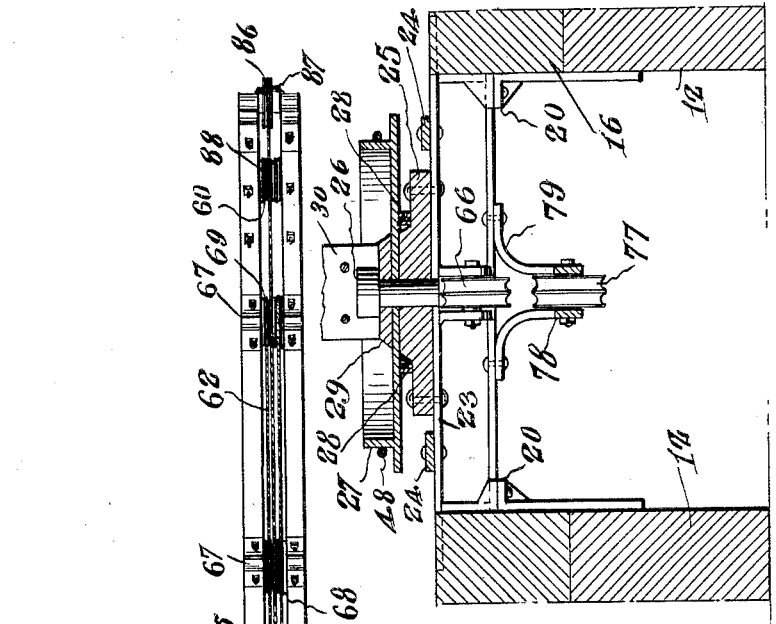
Figure 2:
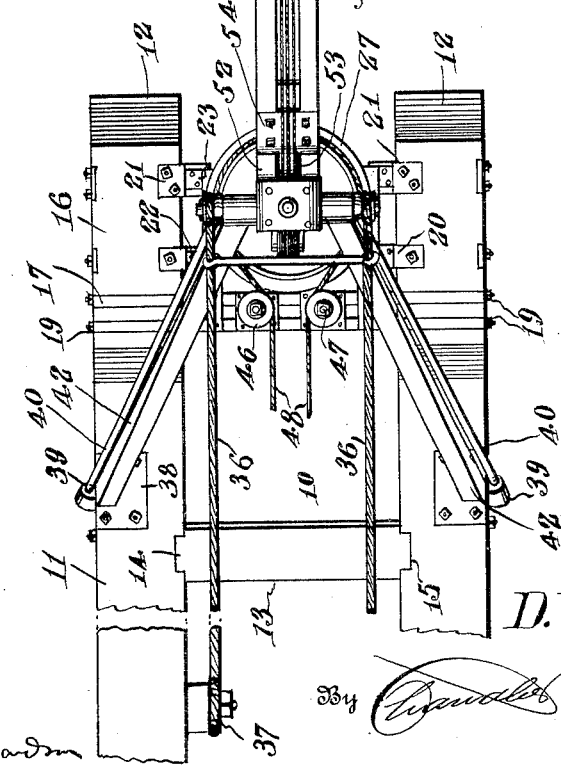

With the above and other objects in view, this invention resides in the novel features of construction, formations, combinations and arrangements of parts to be hereinafter more fully described, claimed and illustrated in the accompanying drawings, in which:

Figure 1 is a side elevation of my invention. Fig. 2 is a top plan view thereof. Fig. 3 is a front elevation thereof. Fig. 4 is a transverse sectional view taken on the line 4—4 of Fig. 1, and Fig. 5 is a horizontal sectional view taken on the line 5—5 of Fig. 1.

Referring to the accompanying drawings throughout the several views, the numeral 10 designates generally my improved stump extractor which is mounted for transportation as shown in the drawings upon a drag or sled boat 11, it being understood however that the said stump extractor may be mounted upon any other conveyance which will be best adapted for its size and particular arrangement of parts.

The drag or sled boat 11 consists of a pair of spaced runners 12 connected and held in parallel relation to each other by a plurality of transverse connecting bars 13, the opposite ends of which are reduced as at 14 to extend in registering openings 15 provided in the adjacent sides of the said runners 12. The forward ends of the runners 12 have secured thereto a pair of equisized supporting blocks 16 which are connected at their rear ends by a pair of parallel transverse straps 17 the opposite ends of which are off-set as at 18 to engage the outer sides of the blocks 16 and runners 12 to which they are bolted or otherwise secured as designated by the numerals 19. A pair of brackets 20 and 21 are secured to the blocks 16 adjacent their forward ends and are connected by a pair of parallel bars 22 and 23 which are in turn connected to the before mentioned bars 17 adjacent the inner edges of the runners 12 by a pair of longitudinal bars 24. A bed plate 25 is secured to the bars 22 and 23 in equi-spaced relation from the inner edges of the said bars 24, and supports by the means of a king bolt 26, a turn table 27 in spaced relation to which it is held by a plurality of anti-friction rings 28. The upper side of the turn table has secured thereto a pair of vertically extending supporting plates 29 between which are rigidly secured a pair of spaced parallel vertical bars 30, which constitute a main supporting mast 31. A pair of brackets 32 embrace the opposite sides and upper ends of the bars 30 to which they are secured as at 33. These brackets 32 are formed with registering bearings 34 in which is journaled a transverse shaft 35, the outer ends of which are connected by a pair of guy rods 36 to the rear ends of the runners 12 to which they are connected as at 37.

A pair of L-shaped plates 38 are secured to the upper edges and outer sides of the runners 12 in the rear of the blocks 16 and are formed in their side flanges with sleeves 39 for the reception of guy rods 40 which are connected as at 41 to the terminals of the shaft 35 adjacent their connections with the guy rods 36 while a pair of angle bars 42 are secured to the horizontal flanges of the plates 38 and are formed with apertures through which the said shaft 35 extends. In order to prevent the displacement of the shaft 35 from the bearings 34, and the displacement of the rods 36 and 40 and bars 42 from the free ends of the said shaft 35, locking pins 44 are passed through openings formed within the ends of the shaft 35.

A pair of plates 45 are secured to the bars 17 adjacent the intermediate points thereof and support a pair of rotatable cable sheaves 46 which are journaled thereon as indicated by the numerals 47. A pair of operating cables 48 which may be actuated by any suitable means not shown in the drawings are passed over the inner sides of these sheaves 46 and have their forward terminals disposed within the channels 49 of the turn table 25. The extremities of these cables 48 are secured to the upstanding lugs 50 of the said turn tables 25 as clearly illustrated and designated by the numerals 51. From this construction it will be obvious that upon moving the proper one of the cables 48, the turn table will be rotated and consequently the mast 31. The forward one of the plates 29 is formed with a pair of ears 52 between which is pivotally secured a tongue 53 formed upon a substantially U-shaped plate 54. A pair of parallel bars 55 are bolted or otherwise secured in spaced relation between the opposite sides of the U-shaped brackets 54 and constitute a supporting boom 56. The bars 55 are held in their spaced parallel relation to each other by connecting rods 57, 58 and 59. A pair of bearings 61 are secured to the under edges of the bars 55 adjacent their upper terminals and have journaled therebetween a pulley 60 over which is passed a cable 62. One end of the cable 62 is attached to the mast 31 as at 63, and the said cable 62 after passing over a pulley 64 journaled in a pair of bearings 65 attached to the rear edges of the bars 30 adjacent the upper ends of the mast 31 is extended over a pulley 66 secured to the under side of the bed plate 25 after which it extends to any suitable operating means not shown in the drawings. When this cable is released, it will be apparent that the boom 56 will be lowered, and it will also be readily seen that when pull is exerted thereon, the said boom 56 will be raised. The upper edges of the bars 55 have secured thereto spaced pairs of bearings 67 between which are journaled pulleys 68 and 69.

The stump engaging member is designated by the numeral 70 and comprises a pair of counterpart side members 71 between the opposite enlarged ends 72 of which are journaled pulleys 73 and 74. A cable 75 is attached to the rod 57 and passes over the pulleys 73 and 68 and over a pulley 76 journaled between the bars 30 intermediate the terminals of the mast 31 and over a pulley 77 journaled upon the depending arms 78 of a bracket 79 supported upon the sled boat 11. From the pulley 77 the cable extends to any suitable operating means not shown in the drawings. A cable 80 is attached to the rod 58 passes over the pulleys 74, 69, 76 and 77 and is connected to the operating member for the cable 75 in such manner that when pull is exerted upon these said cables 75 and 80, the bars 71 will be raised relative to the boom 56. The upper edges of the bars 71 are provided with spaced notches 81 for the reception of the connecting pins 82 of the clevises 83 which support the customary hooks 84 arranged for engagement with the stump chains not shown in the drawings. Obviously when pull is exerted upon the cables 75 and 80 the stump will be extracted from the ground. In this operation the stump may be loosened by swinging the boom 56 laterally of the sled boat 11 by means of the cables 48. A pair of brackets 85 are attached to the upper ends of the bars 55 and are equipped with bearings 86 between which is journaled a pulley 87. A cable 88 is attached to the rod 59 and after passing through a chain engaging tackle 89, the said cable passes over the pulleys 64 and 87 and over the pulley 66 to a suitable operating means not shown. After the stump has been extracted the tackle 89 is secured to the stump chain and by swinging the boom 56 it will be readily seen that the extracted stumps can be conveniently arranged in piles. Pulleys 90 and 91 are journaled between the runners 12 as clearly illustrated in Fig. 3. These pulleys are adapted to be engaged by cables 92 through the medium of which the apparatus may be propelled along the ground. This operation is effected by securing one end of the cables to a fixed object such as a stump and then winding the cable upon a drum (not shown) carried by the apparatus.

It should be understood in this connection that various minor changes in the details of construction may be resorted to within the scope of the appended claim without departing from or sacrificing any of the advantages of the invention.

From the foregoing disclosures taken in connection with the accompanying drawings it will be readily seen that a stump extractor is provided which will fulfil all of the necessary requirements of such a device.

Having thus fully described this inven- tion what I claim as new and desire to protect by Letters Patent, is:

In a device of the class described, the combination of a base, a turn table mounted on said base, a mast carried by said turn table, a boom pivotally connected at one end to the lower end of the mast, a pair of hoisting riggings mounted on the base, mast and boom and supporting in suspension respective ends of a bar, and stump chain engaging means slidably adjustable on said bar.

In testimony whereof, I affix my signature, in presence of two witnesses.

DENNIS W. MERRILL.

Witnesses:
H. H. HEWITT,
CECILE KNOX.

Copies of this patent may be obtained for five cents each, by addressing the "Commissioner of Patents, Washington, D. C."